July 10, 1928.

T. P. DOHERTY

PLUMBER'S TOOL

Filed July 26, 1927

Inventor
Thomas P. Doherty
By Perley H. Plant
Attorney

Patented July 10, 1928.

1,676,775

UNITED STATES PATENT OFFICE.

THOMAS P. DOHERTY, OF PROVIDENCE, RHODE ISLAND.

PLUMBER'S TOOL.

Application filed July 26, 1927. Serial No. 208,531.

This invention relates to a plumber's tool of the character particularly adapted for use in the installation of bath tubs, wash bowls, and the like, although capable of use generally in the installation or removal of piping and for general purposes in connection with work of that character.

One object of the invention is to provide a device of this character adapted for use in the dual capacities of pipe holder or pipe wrench and trap turner or holder.

Another object of the invention is to provide a device of this character provided with pivoted elbow arms capable of extension or retraction to engage the interior of a pipe or openings therein, and having means readily actuatable by the operator for extending or retracting said arms as well as means for locking said arms in extending position when desired.

Other objects and advantages of the invention relate to various improved details of construction and novel methods of operation as will be more fully set forth in the detailed description to follow.

Referring to the accompanying drawings.

Figure 1:
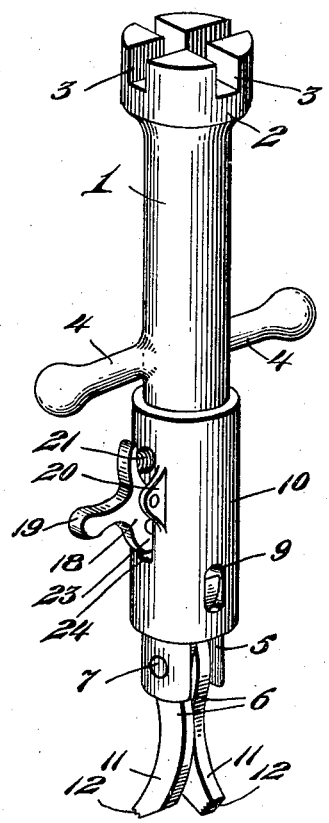
Fig. 1 is a perspective view of the improved device, showing the position of the parts when the elbow arms are in retracted position.

As shown in the drawings, 1 designates the tool shaft which is provided at one end with a head 2 having grooves 3 formed therein and located at right angles to each other. The shaft is also provided with handles 4 extending outwardly from opposite sides thereof, and, in the embodiment illustrated, cast integral with the shaft, although they may be formed by driving a pin through a suitable opening formed in the shaft or in any other desired manner.

Figure 2:
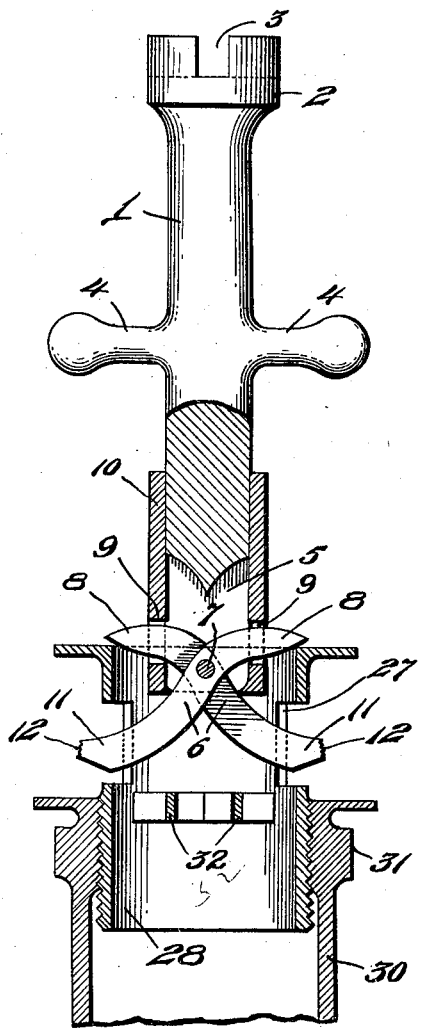
Fig. 2 is a side elevational view, partially in section, illustrating the position of the parts when the elbow arms are in extending position and in engagement with a pipe section.

The end of the shaft 1 opposite to the grooved head 2 is slotted as indicated at 5 and has mounted therein a pair of elbow arms 6, pivotally secured to the shaft by means of a pin or rivet 7. The pin or rivet 7 is passed through the arms 6 at points adjacent the elbows or bends therein, as shown in Fig. 2, and the outturned ends 8 of said arms which extend inwardly of the shaft project through openings 9 formed in a slidable sleeve 10 when the arms are in extended position. The outturned ends 11 of the arms 6 which extend outwardly of the shaft 1 are each provided with a corrugated or roughened portion 12 for a purpose which will be more fully set forth hereinafter.

Figure 3:
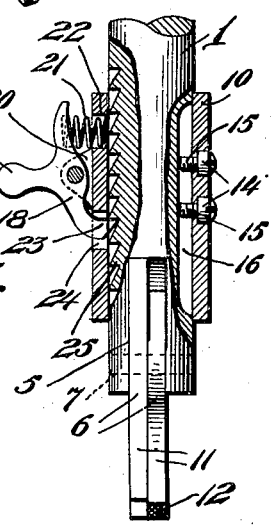
Fig. 3 is a detail sectional view illustrating the relation of the sleeve to the shaft and the pawl and ratchet mechanism for movably securing the sleeve to the shaft.

The sleeve 10 mounted on the shaft 1 is slidable thereon, and may be held against rotation on the shaft by means of pins or screws 14 secured in the sleeve and provided with end portions 15 adapted to fit within the groove 16 formed in the shaft. A pawl 18, provided with a handle 19, is pivotally mounted in ears 20 carried by the sleeve 10, and a spring 21 is mounted in depressions 22 formed in the sleeve 10 and a portion of the pawl, whereby the pawl is normally held in the position shown in Fig. 3 with the detent portion 23 extending through an opening 24 in the sleeve and engaging one of the teeth 25 formed upon one side of the shaft 1.

When the sleeve 10 is in retracted position as shown in Fig. 1, the elbow arms are drawn inwardly and lie entirely within the circumference of the sleeve 10, but when the sleeve 10 is moved into its extended position, as shown in Fig. 2, the elbow arms 6 are moved into the position shown in Fig. 2, wherein the outturned ends 11 which extend outwardly of the shaft 1 are moved radially outwardly to force the roughened or corrugated ends 12 into contact with the interior of a pipe or to cause the ends 11 to project through the drain openings 27 in a wash bowl pipe 28 whereby the pipe section 28 may be turned or held against turning while the connection 30 is threaded thereon or removed therefrom by a wrench engaging the squared portion 31 thereof.

The wash bowl pipe 28 is provided with bars 32 located at right angles to each other and serving as a screen or trap for preventing refuse from passing into the drain pipe, and the grooves 3 in the head 2 are formed to engage the bars 32 when desired for rotating the drain pipe 28, or for engaging similar bars in the drain pipe of a bath tub to remove the same from the bath tub drain pipe or insert the screen or trap therein.

It will be seen that the provision of the grooved head provides means for engaging the cross bars 32 for starting the drain pipe 28 into the connection 30 or for use in connection with such bars under circumstances where great strain is not exerted, while the elbow arms 6 may be employed when it is difficult to separate these parts by reason of their having been so securely connected that considerable force is required. By means of the arrangement of the handles 4 and pawl handle 19, the operator may move the sleeve 10 in either direction upon the shaft 1 by pressing a finger against the pawl and thus readily control the movement of the sleeve 10 on the shaft.

By pressing the handle of the pawl downwardly from the handles 4 the sleeve may be moved downwardly, the detent sliding over the teeth 25 until the outwardly extending portions 11 of the elbow arms are extended sufficiently either to force the roughened ends 12 into binding engagement with the interior of the pipe or to bring the portions 11 into oppositely positioned openings, such as 27. The detent engaging one of the teeth 25 will hold the elbow arms extended until released by an upward pull on the handle 19 of the pawl, which will release the detent 23 and raise the sleeve 10 to retract the elbow arms.

It will be seen that the sleeve 10 is held against rotation on the shaft 1 by means of the end portions 15 of the pins 14 engaging the groove 16, and the extent of movement of the sleeve 10 on the shaft 1 may be accordingly limited by the length of the groove 16. When the roughened end 12 of the elbow arms 6 are forced against the interior surface of the pipe or into openings, such as indicated by the numeral 27 therein, the pipe may be held against rotation or engaged to be lifted when the pipe is in such position as to be inaccessible by ordinary means. The construction is such as to enable the device to be readily employed in pipes of varying size, since the retracted position of the elbow arms is such as to permit its use in all pipes of a diameter less than the external diameter of the sleeve 10.

What I claim is:

1. A device of the character described comprising a shaft provided with a handle and having one end thereof slotted, elbow shaped arms pivotally supported by said shaft within the slotted end thereof at points adjacent to the elbows, a sleeve slidably mounted on said shaft, and provided with oppositely positioned openings for the reception of the outturned ends of said arms which extend inwardly of the shaft whereby the outturned ends of said arms on opposite sides of their pivot points are withdrawn within the circumference of said sleeve when the sleeve is in retracted position and forced outwardly beyond the circumference of said sleeve when the sleeve is forced downwardly upon the shaft.

2. A tool of the character described comprising a shaft provided at one end thereof with a grooved head, and having the opposite end thereof slotted, elbow arms pivotally supported within the slotted end of said shaft whereby the outturned ends of each arm project in opposite directions from the center of the shaft, a sleeve slidably mounted on said shaft and provided with oppositely positioned openings for the reception of the outturned ends of said arms which extend inwardly of the shaft, and means for releasably securing said sleeve to said shaft in any one of a plurality of adjusted positions.

3. A tool of the character described comprising a shaft provided at one end with a grooved head and having the opposite end thereof slotted, a handle located intermediate the ends of said shaft, elbow arms pivotally supported within the slotted end of said shaft whereby the outturned ends of each arm projected in opposite directions from the center of the shaft, a sleeve slidably mounted on said shaft and provided with oppositely positioned openings for the reception of the outturned ends of said arms which extend inwardly of the shaft, and a spring pressed pawl carried by said sleeve and engageable by the operator to move the sleeve in either direction on the shaft while normally cooperating with teeth carried by said shaft to hold the sleeve against movement when the same is in extended position on the shaft.

4. In a device of the character described, a shaft provided with a handle and having one end thereof slotted, elbow shaped arms pivotally supported within the slotted end of said shaft whereby the outturned ends of each arm project in opposite directions from the center of the shaft, a sleeve slidably mounted upon said shaft and provided with oppositely positioned openings for the reception of the outturned ends of said arms which extend inwardly of the shaft, and a spring pressed pawl carried by said sleeve and engageable by the operator to move the sleeve in either direction on said shaft while normally cooperating with teeth carried by said shaft to hold the sleeve against rearward movement on the shaft and thus maintain the arms in extended position.

In testimony whereof I have affixed my signature.

THOMAS P. DOHERTY.